(12) United States Patent
Kwon (10) Patent No.: US 8,785,060 B2
(45) Date of Patent: Jul. 22, 2014

(54) METHOD OF MANUFACTURING MULTILAYER ELECTROLYTE REINFORCED COMPOSITE MEMBRANE

(75) Inventor: Nak Hyun Kwon, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 785 days.

(21) Appl. No.: 11/648,748

(22) Filed: Dec. 29, 2006

(65) Prior Publication Data

US 2008/0107803 A1   May 8, 2008

(30) Foreign Application Priority Data

Nov. 2, 2006   (KR) .................. 10-2006-0107901

(51) Int. Cl.
*H01M 8/06*   (2006.01)

(52) U.S. Cl.
USPC .......................................... 429/408; 429/409

(58) Field of Classification Search
USPC ............................................... 429/34
See application file for complete search history.

(56) References Cited

U.S. PATENT DOCUMENTS

| | | | | |
|---|---|---|---|---|
| 4,110,392 A | * | 8/1978 | Yamazaki .................. | 264/127 |
| 5,071,609 A | * | 12/1991 | Tu et al. .................... | 264/119 |
| 5,314,653 A | * | 5/1994 | Haralambopoulos ......... | 264/301 |
| 6,242,135 B1 | * | 6/2001 | Mushiake .................... | 429/304 |
| 2004/0131919 A1 | * | 7/2004 | Yasumoto et al. ............. | 429/42 |
| 2006/0177719 A1 | * | 8/2006 | Fuller et al. .................... | 429/33 |
| 2006/0280983 A1 | * | 12/2006 | Kaneko et al. .................. | 429/33 |

FOREIGN PATENT DOCUMENTS

| | | | |
|---|---|---|---|
| DE | 697 17 674 T2 | | 12/2003 |
| DE | 602 23 539 T2 | | 9/2008 |
| JP | 06-029032 | | 2/1994 |
| JP | 08-162132 | | 6/1996 |
| JP | 2005-166329 | * | 6/2005 |
| KR | 2001-0091642 | | 10/2001 |
| KR | 2006-0083372 | | 7/2006 |
| KR | 2006-0083374 | | 7/2006 |

* cited by examiner

*Primary Examiner* — Ula C Ruddock
*Assistant Examiner* — Jacob Marks
(74) *Attorney, Agent, or Firm* — Morgan, Lewis & Bockius LLP (57) ABSTRACT

The present invention relates to a method of manufacturing a multilayer electrolyte reinforced composite membrane that is mechanically stable and cost-efficient and has superior hydrogen ion conductivity even when exposed to low humidity and high temperature conditions. The method of the invention involves a stretching process and a series of drying steps to provide a hydrogen ion exchange membrane of a three-layer structure comprising: a matrix layer of a hydrogen ion exchange membrane impregnated and stretched with a polymer electrolyte sandwiched between two electrolyte coated layers.

11 Claims, 7 Drawing Sheets

Thickness:
(a) 50 μm, (b) 30 μm,
(c) 17 μm, (d) 17 μm, (e) 34 μm

METHOD OF MANUFACTURING MULTILAYER ELECTROLYTE REINFORCED COMPOSITE MEMBRANE

CROSS-REFERENCE TO RELATED APPLICATION

This application claims the benefit of Korean Patent Application No. 10-2006-0107901, filed on Nov. 2, 2006, the disclosure of which is incorporated herein by reference in its entirety.

BACKGROUND OF THE INVENTION

1. Field of the Invention

The present invention relates to a method of manufacturing a multilayer electrolyte reinforced composite membrane and, more particularly, to a method of manufacturing an electrolyte reinforced composite membrane having an excellent mechanical stability and a superior hydrogen ion conductivity with a thin film membrane. Moreover, the present invention carries out a stretching process and a drying process an optimum number of times and provides a hydrogen ion exchange membrane of a three-layer structure that comprises: a matrix layer of a hydrogen ion exchange membrane impregnated and stretched with a polymer electrolyte; and electrolyte coated layers established on the upper and lower portions of the matrix layer. Accordingly, the present invention can lower the manufacturing cost and maintain the ion conductivity even under the conditions of low humidity and high temperature.

2. Description of Related Art

Polymer Electrolyte Membranes (PEMS) have been used as ion exchange membranes in polymer electrolyte membrane fuel cells (hereinafter, referred to as PEMFCs), chemical sensors, biofuel cells, etc. due to their functional properties. Recently, the development of fuel cells using hydrogen as a safe and clean fuel has attracted attention as the seriousness of resource depletion and environmental concerns is raised worldwide. Accordingly, with the growing application of PEMFCs to vehicles, mobiles, and other contexts, effort is being made on developing more stable polymer electrolyte membranes with good hydrogen ion conductivity.

As recognized by those of skill in the art, polymer electrolyte membranes in PEMFCs should serve a variety of functions, such as providing insulation between the anode and cathode and enabling hydrogen ion exchange. Moreover, polymer electrolyte membranes should ideally be chemically and physically stable and able to withstand conditions of high temperatures and humidity, low pH (less than pH 2) and high pressure. Accordingly, it is necessary to develop a better reinforced polymer electrolyte membrane and thereby enhance the performance and stability of PEMFC.

Conventional ion exchange membranes in use include perfluorinated polymer electrolyte membranes (perfluorinated sulfonic acid PFSA or perfluorinated carboxylic acid PFCA), which have excellent chemical stability and good ion conductivity (~1.0 S/cm) under humid conditions. These conventional membranes are however expensive and prone to rapid deterioration of their thermal and physical properties, e.g. ion conductivity, when exposed to low humidity and high temperatures. Moreover, the application of a single membrane that is 25 μm or less in thickness is technically demanding due to its relative mechanical instability. To improve the performance of fuel cells, it is however necessary to reduce electrical resistance by minimizing the thickness of the polymer electrolyte membrane. In meeting this challenge, efforts have been devoted toward developing thin membranes with improved thermal and chemical stability. Hydrocarbon membranes (e.g., PEEK, polyarylene ether, PBI, etc.) and perfluorinated reinforced membranes (e.g., Gore-select, Flemion SH) have attracted attention as potential substitute for perfluorinated single membranes. These hydrocarbon membranes have lower manufacturing costs and can better withstand high temperatures and low humidity. However, their performance cannot match that of perfluorinated single membrane under humidity conditions of 100% or less and, further, their chemical stability is lower than that of perfluorinated single membranes.

The perfluorinated reinforced membranes have been contrived to solve the drawbacks of the existing perfluorinated single membranes. Such membranes manufactured by mixing perfluorinated polymer electrolytes with supports have excellent chemical stability and mechanical stability as compared with the single membranes. Moreover, it is possible to manufacture thin film membranes to reduce the membrane resistance and increase the hydrogen ion conductivity, thus enhancing overall fuel cell power. Furthermore, it is possible to increase the power density per unit area of fuel cells to reduce the amount in use of polymer electrolyte membranes in manufacturing stacks having the same power density, thus decreasing the manufacturing cost. Other potential candidates for PEMFC incorporation include reinforced membranes that use a PVDF film. However, such membranes typically have a high gas-crossover, which is presumably caused by certain weak spots in the membrane generated when the polymer electrolyte resin is not impregnated densely into the porous support during the manufacturing process, thereby negatively affecting the long-term stability of fuel cells. In light of the above, there is a need in the art for improved electrolyte membranes having better mechanical stability and ion conductivity even under low humidity and high temperatures.

SUMMARY OF THE INVENTION

The present invention provides a method of manufacturing a multi-layer high-density reinforced composite membrane comprising: primarily stretching a film; a second step of impregnating the primarily stretched film with an electrolyte solution, drying the resulting film at 80-130° C. and secondarily stretching the dried film repeatedly two to ten times to form a matrix layer; coating the upper and lower portions of the matrix layer with the electrolyte solution and drying the resulting matrix layer at 100-150° C. to form an electrolyte coated layer; and hot-pressing the electrolyte coated layer at 120-150° C.

BRIEF DESCRIPTION OF THE DRAWINGS

The above and other features of the present invention will be described with reference to certain exemplary embodiments as illustrated in the drawings.

DETAILED DESCRIPTION OF THE INVENTION

Hereinafter, preferred embodiments of the present invention will be described in detail with reference to the drawings.

The present invention relates to a method of manufacturing an electrolyte reinforced composite membrane with a three-layer structure comprising a matrix layer of a hydrogen ion exchange membrane impregnated and stretched with a polymer electrolyte sandwiched between two electrolyte coated layers, the electrolyte reinforced composite membrane having an excellent mechanical stability and a superior hydrogen ion conductivity due to the low thickness, a high cost-efficiency and an excellent ion conductivity even under conditions of low humidity and high temperatures.

The respective steps of the method of manufacturing a multi-layer electrolyte reinforced composite membrane in accordance with the present invention will be described as follows.

First, in stretching the film, it is desirable that a porous film be used and be stretched to facilitate impregnation with polymer electrolyte in making a thin electrolyte hydrogen ion exchange membrane. More specifically, it is preferred that the thickness of the film stretched be about 1-90%, more preferably, about 10-60% of the original thickness of the film before stretching. In preferred embodiments, the film has a porosity of about 60-90% and pore size of about 100-1,000 nm. If the porosity is less than about 60%, impregnation of the polymer electrolyte becomes difficult and the hydrogen ion conductivity is decreased since the absolute content of the electrolyte is low, whereas, if it exceeds 90%, the mechanical stability of the membrane may be decreased. If the size of internal pores is less than 100 nm, it may cause a defect in the impregnation of polymer electrolyte, whereas, if it exceeds 1,000 nm, the mechanical stability of the membrane may not be ensured. The primary stretching process is carried out slowly for about 2-10 minutes so that a porous support is uniformly stretched bidirectionally over the whole area. Here, the degree of initial stretching is suitably within 10-50%. If it is greater than that, the membrane may be torn.

Next, the second step is performed in which the porous support film is impregnated with an electrolyte solution and the drying and secondary stretching processes are repeated at 80-130° C. two to ten times to form a matrix layer. The second step that is the core of the present invention is executed two to ten times on both sides. If the number of times of the process is less than two times, it is difficult to obtain a high membrane performance since a dense impregnation of polymer electrolyte is not made, whereas, if it exceeds ten times, it causes a problem in that the hydrogen ion conductivity is lowered since the thickness of the reinforced composite membrane becomes larger due to the increase in the thickness of the matrix layer. After the secondary stretching and drying processes of two to ten times, the area of the porous membrane in which the electrolyte solution is infiltrated is increased gradually and, on the contrary, the thickness of the membrane is decreased, thus obtaining a desired thin matrix layer. Here, the final thickness is suitably 1-90% of the thickness before the stretching process and, preferably, 10-60%. Like this, it is possible to manufacture a matrix layer 20 of a thickness of 20 µm or less. The electrolyte solution used is desirably a perfluorosulfonate ionomer (Nafion, Hyflon ion). Here, it is desirable to use a mixed solution, in which the perfluorosulfonate ionomer (hereinafter, referred to as ionomer) is mixed with a heteropoly acid (hereinafter, referred to as HPA) in a weight ratio of 100:0.01-100:10. If the weight ratio is less than 100:0.1, it has a little effect on the ion conductivity, whereas, it is exceeds 100:10, the membrane stability may be deteriorated. It is more effective to use a heterophosphotungsten acid (hereinafter, referred to as HPW) having an excellent hydrogen ion conductivity and a superior mixability with the electrolyte solution as a HPA.

Here, if the drying temperature is less than 80° C., the crystallization of the polymer electrolyte is lowered, whereas, if it exceeds 130° C., the deterioration of the polymer electrolyte may be caused. The secondary stretching process is to infiltrate the electrolyte solution into the support film to be impregnated uniformly and then stretched slowly for 1-10 minutes. If the stretching time is less than 1 minute, it is difficult to ensure a uniform stretching over the whole area, whereas, if it exceeds 10 minutes, the electrolyte solution is dried during the stretching process, thus making the membrane non-uniform.

Subsequently, the third step of coating the upper and lower portions of the matrix layer with the electrolyte solution one to three times and drying the resulting matrix layer at 100-150° C. to form electrolyte coated layers will be described as follows. The polymer electrolyte used in performing the third step one to three times is one that is generally available in the art and the components are not especially limited, however, it is desirable to use the perfluorosulfonate ionomer, the same one used in the matrix layer, and it is more preferable that a mixed solution in which the perfluorosulfonate ionomer is mixed with HPA be used to improve the hydrogen ion conductivity and the high temperature properties.

In the step of coating both sides of the matrix layer with the electrolyte solution one to three times, if the coating process is not carried out, it is impossible to obtain uniform thickness and shape of the membrane, thus causing problems in that the mechanical stability and the adhesion with a catalyst layer in manufacturing an MEA are lowered, whereas, if it is performed more than three times, it still causes a problem in that it is difficult to regulate the membrane thickness. The reason why the drying process is carried out at 100-150° C. for 30-60 minutes is because the drying process at high temperature induces the recrystallization of the electrolyte to form a denser polymer layer and improve water resistance, chemical resistance and hydrogen ion exchanging function.

Next, the fourth step of hot-pressing at 120-200° C. is carried out to effect a final high dense reinforced composite membrane. The hot-pressing process is performed in the ordinary method used in the art and the method is not especially limited, however, it is more effective to use a hot press roll that is advantageous to a continuous process and has a small contact area.

The hydrogen ion exchange composite membrane manufactured in the method of the present invention has various advantages such as an excellent mechanical stability due to a unique design with the stretching and impregnating processes of the hydrogen ion exchange membrane and the three-layer structure, a superior hydrogen ion conductivity due to the overall thickness of 30 µm or less, especially, 15 µm or less, a remarkably reduced thickness compared with the existing commercial membranes and an improved durability.

The structural properties and functions of the reinforced composite membrane manufactured in the above method of the present invention will be described as follows.

Figure 1:
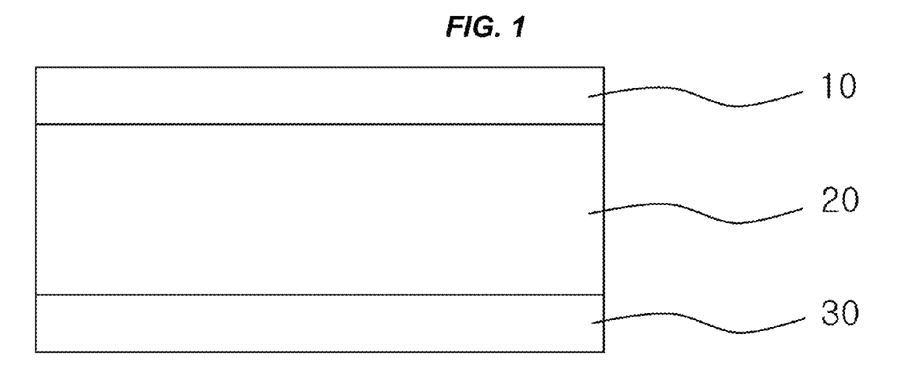
FIG. 1 is a cross-sectional view depicting a hydrogen ion exchange composite membrane in accordance with the present invention.
Figure 2:
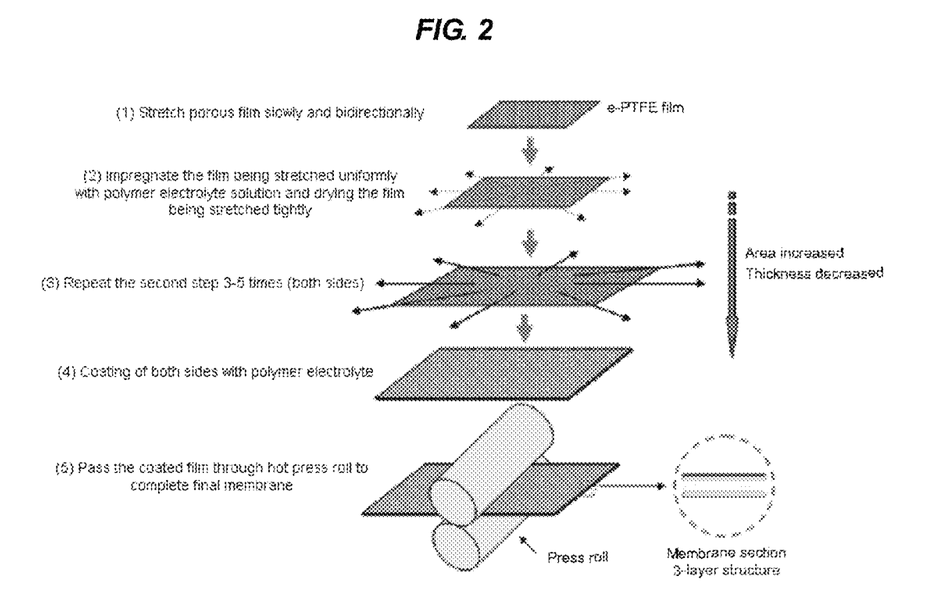
FIG. 2 is a flow diagram of an electrolyte reinforced composite membrane in accordance with the present invention.

FIG. 1 is a cross-sectional view depicting a hydrogen ion exchange composite membrane in accordance with the present invention having a three-layer structure comprising a lower polymer electrolyte coated layer 30, a matrix layer 20 formed by impregnating a porous film with a polymer electrolyte, and an upper polymer electrolyte coated layer 10.

The matrix layer 20 is an e-PTFE composite membrane filled with Nafion or Nafion HPW, for example, in which the polymer film layer is a significant layer that increases the mechanical strength of the overall membrane and improves the hydrogen ion conductivity with a thin film membrane, which can be obtained by impregnating the porous structure of the composite membrane with the polymer electrolyte in a high density. This porous membrane has uniform holes of 0.1-1 µm in size, through which the electrolyte solution such as a Nafion-HPW mixed solution can be readily infiltrated, and a sufficient amount of ionomers can be filled therein due to its inside structure having pores of 1-2 µm in size. Moreover, the stretching process for stretching the membrane is feasible due to its ductility and mechanical stability.

The electrolyte coated layers 10 and 30 are a Nafion-HPW coated layer, for example, and it is possible to reinforce the hydrogen ion conductivity and the thermal stability by coating both sides of the matrix layer 20 with smooth and dense external film layers of about 2-10 µm in thickness. The external film layer minimizes the interfacial resistance when being in contact with electrodes and, further, polarizes the membrane surface to make hydrogen ions and moisture to move in and out the membrane. Moreover, it is possible to maintain the excellent hydrogen ion conductivity even under the conditions of high temperature and low humidity by using HPA that is identical with HPW.

Hereinafter, the present invention will be described in more detail with respect to the following example, comparative examples and experimental example; however, the scope of the present invention is not limited to the example.

EXAMPLE

Figure 3:
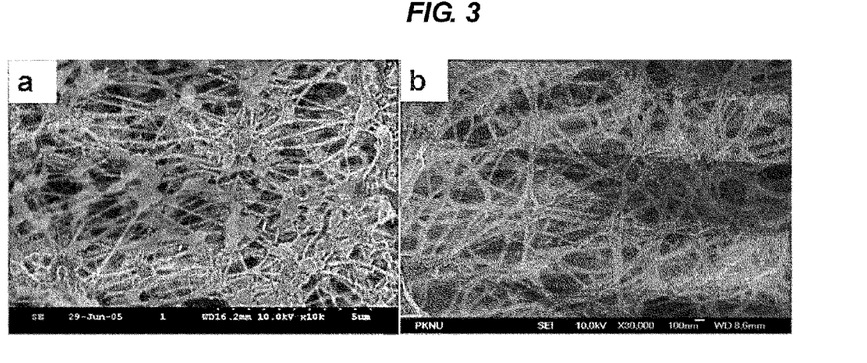
FIG. 3a shows a scanning electron microscope photograph of the surface of an e-PTFE film applied to the present invention.
FIG. 3b shows a SEM photograph of the lateral side of an e-PTFE film applied to the present invention.
Figure 4:
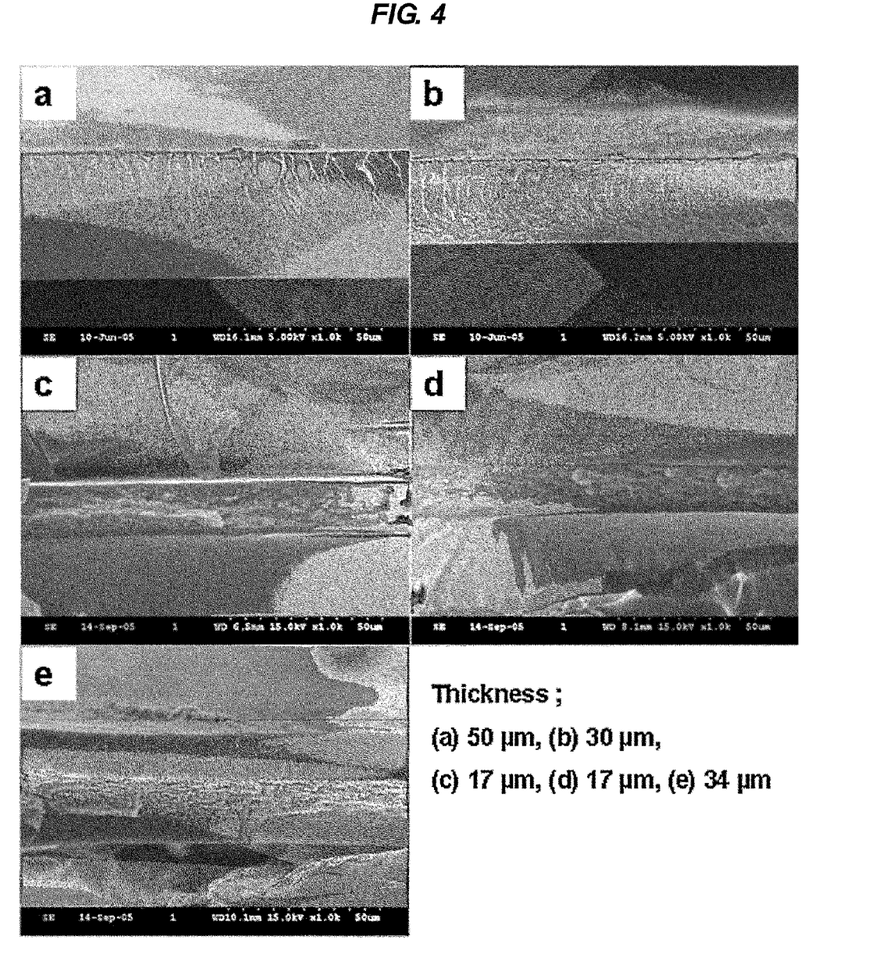
FIG. 4a shows a SEM photograph of the lateral side of a Nafion 112 polymer electrolyte membrane.
FIG. 4b shows a SEM photograph of the lateral side of a Flemion SH polymer electrolyte membrane.
FIG. 4c shows a SEM photograph of the lateral side of a HM-20G polymer electrolyte membrane.
FIG. 4d shows a SEM photograph of the lateral side of a HM-20S polymer electrolyte membrane.
FIG. 4e shows a SEM photograph of the lateral side of a HM-35S polymer electrolyte membrane.

The porous films used in the present invention are e-PTFE (TX 3107) having a porosity of about 80-90% and a thickness of 1.5 mil, in which the size of internal pores is 150-200 nm. Scanning electron microscope photographs of the e-PTFE film applied to the present invention are depicted in FIG. 3a (surface) and FIG. 3b (lateral side). The e-PTFE film has a network structure having extremely fine pores.

The films were subjected to the above-described membrane manufacturing process, in which the films were uniformly stretched, a perfluorinated polymer electrolyte (perfluorinated ionomer) was filled in the fine pores and dried at high temperature (120° C.). Here, the stretching and impregnating/drying processes were repeated three times, respectively, and both sides of the membrane were coated with the Nafion solution, a perfluorinated polymer electrolyte, thus preparing final membranes.

Finally, three kinds of high dense reinforced composite membranes were prepared. The membranes with a three-layer structure had the following components. HM-20G comprised Nafion layer, e-PTFE+Nafion layer and Nafion layer, HM-20S comprised Nafion-HPA layer, e-PTFE+Nafion-HPA mixed layer and Nafion-HPA layer, and HM-35S comprised Nafion layer, e-PTFE+Nafion-HPA mixed layer and Nafion layer.

Comparative Example 1

Nafion 112 (DuPont Inc.)

Comparative Example 2

Flemion SH (Asahi Glass Co., Ltd.)

TABLE 1

Comparison of thickness and water absorption in accordance with the kind of the membranes

| Examples | | Thickness (µm) | Water Absorption (%) |
|---|---|---|---|
| Example | HM-20G | 17 | 11 |
| | HM-20S | 17 | 13 |
| | HM-35S | 34 | 20.8 |
| Comparative Example 1 | | 50 | 23 |
| Comparative Example 2 | | 30 | 29 |

TABLE 2

Results of assessment of unit cells in accordance with the kind of the membranes
(Conditions: temperature 80° C., humidity 100% and fuel $H_2/O_2$)

| Examples | | *Current Density (A/cm$^2$) | *Power Density (W/cm$^2$) | Maximum Power Density (W/cm$^2$) |
|---|---|---|---|---|
| Example | HM-20G | 2.20 | 1.32 | 1.70 |
| | HM-20S | 3.20 | 1.90 | 2.25 |
| | HM-35S | 2.30 | 1.40 | 1.77 |
| Comparative Example 1 | | 1.42 | 0.80 | 1.12 |
| Comparative Example 2 | | 2.10 | 1.28 | 1.68 |

*Values measured at 0.6 V

Experimental Example

Figure 5:
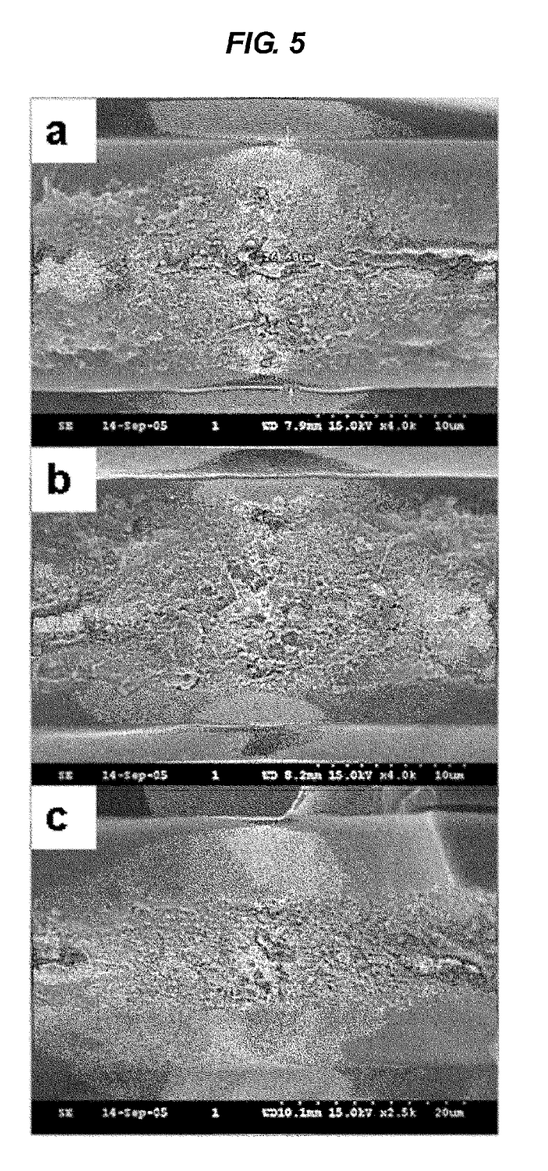
FIG. 5a shows an enlarged SEM photograph of the lateral side of a reinforced composite membrane (HM-20G) manufactured in accordance with the present invention.
FIG. 5b shows an enlarged SEM photograph of the lateral side of a reinforced composite membrane (HM-20S) manufactured in accordance with the present invention.
FIG. 5c shows an enlarged SEM photograph of the lateral side of a reinforced composite membrane (HM-35S) manufactured in accordance with the present invention.

1. Thickness of membranes: Measurements were made through a scanning electron microscope (SEM). As depicted in Table 1, the thicknesses of Nafion 112 and Flemion SH membranes were 50 and 30 µm, respectively, and the membranes were the single membranes. It could be seen that the thicknesses of high dense HM-20G, HM-20S and HM-35S membranes of the present invention were 17, 17 and 34 µm and the membranes had the three-layer structure. As can be seen from FIGS. 5a to 5c showing enlarged SEM photographs of the lateral sides of the high dense reinforced composite membranes, the middle layers were matrix layers in which perfluorinated polymer electrolyte (Nafion) was infiltrated densely into the porous e-PTFE and the perfluorinated polymer electrolyte layers were formed in a uniform thickness on both layers.

2. Water absorption: Weights (1) of the membranes vacuum-dried at 60° C. for 12 over hours were measured. Then, after dipping the membranes in DI water at room temperature for two to three days, the membranes were taken out to remove water on the surfaces and weights (2) were measured to calculate the increased weights. As depicted in Table 1, the high dense reinforced composite membranes of the example had generally lower water absorptions than the commercialized membranes.

3. Thermal stability: Measurements were made through the thermogravimetric analysis (TGA). The weight change curves in accordance with the thermal changes of HM-20G, HM-20S, HM-35S, comparative example 1 (Nafion 112) and comparative example 2 (Flemion SH) were depicted in FIG. 6. In general, it has been known that the degradation of sulfonic acid groups occurs at 290-400° C., the polymer side chains are resolved at 400-470° C., the back bones of PTFE are cut at 470-560° C. in the Nafion membrane ($T_g$=103° C.), which can be seen in FIG. 6. The TGA curves of comparative example 1 (Nafion 112) and comparative example 2 (Flemion SH) are divided into the following three steps.

First, the weight reductions were slowly shown in about 10% in the vicinity of 20-300° C. (first step: volatilization of binding water), the weight reductions were slowly increased at 300-460° C. (second step: degradation of sulfonic acid groups) and the weight reductions were sharply shown at 460-560° C. (third step: clacking of PTFE back bone). Here, it could be found that the weight reduction of the membrane of comparative example 1 was shown large in the first and second steps, since comparative example 1 (EW:1100, PFSA) and comparative example 2 (EW:1000, PFCA) had the differences in EW values and the ionomer structures used were different from each other, and the weight reduction of comparative example 2 (Flemion SH) proceeded more slowly than that of comparative example 1 (Nafion 112) in the third step, which was judged that the deterioration of the polymer frame in the membrane of comparative example 2 (Flemion SH) containing PTFE fibers proceeded at higher temperature than the membrane of comparative example 1. The HM-20G membrane of the example showed a thermal stability higher than the membranes of comparative example 1 (Nafion 112) and comparative example 2 (Flemion SH) since it had a greater absolute amount e-PTFE of high thermal stability in the total weight of the membrane. The HM-20S membrane of the example showed the same thermal behavior as the membrane of comparative example 1 (Nafion 112) from the room temperature to 270° C. and a sharp weight reduction occurred at 270-320° C.

Such phenomenon generally occurred in the membrane using HPA and it was judged that the weight reductions occurred since the binding water strongly bound to HPW was sharply evaporated according as the temperature increased. The HM-35S of the example showed nearly same thermal changes as the membrane of comparative example 1 (Nafion 112), while some changes were shown at 320-360° C., which was because the membrane contained a large amount of Nafion ionomers, although HPW was used.

Figure 6:
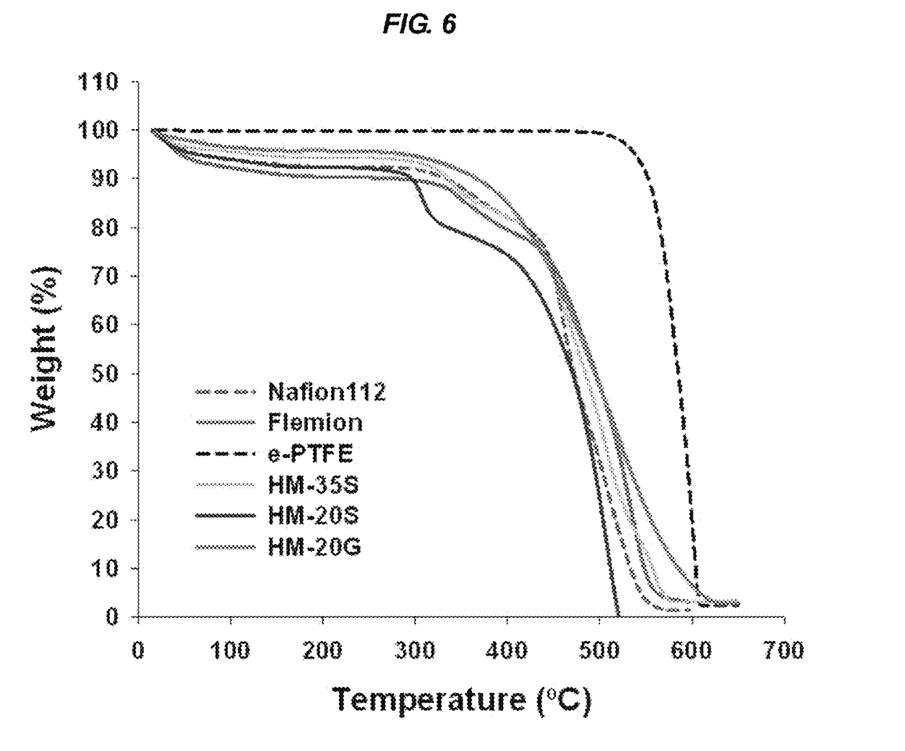
FIG. 6 is a graph depicting the results of thermogravimetric analysis (TGA)

Meanwhile, TGA results of the e-PTFE film used as supports of the high dense reinforced composite membranes of the present invention could be found in FIG. 6. Weight reductions hardly occurred from the room temperature to 560° C., however, the weight reductions were shown sharply at over 560° C. due to the collapse of the polymer frames. Accordingly, it can be understood that the thermal stability of the e-PTFE is very excellent up to 560° C.

Figure 7:
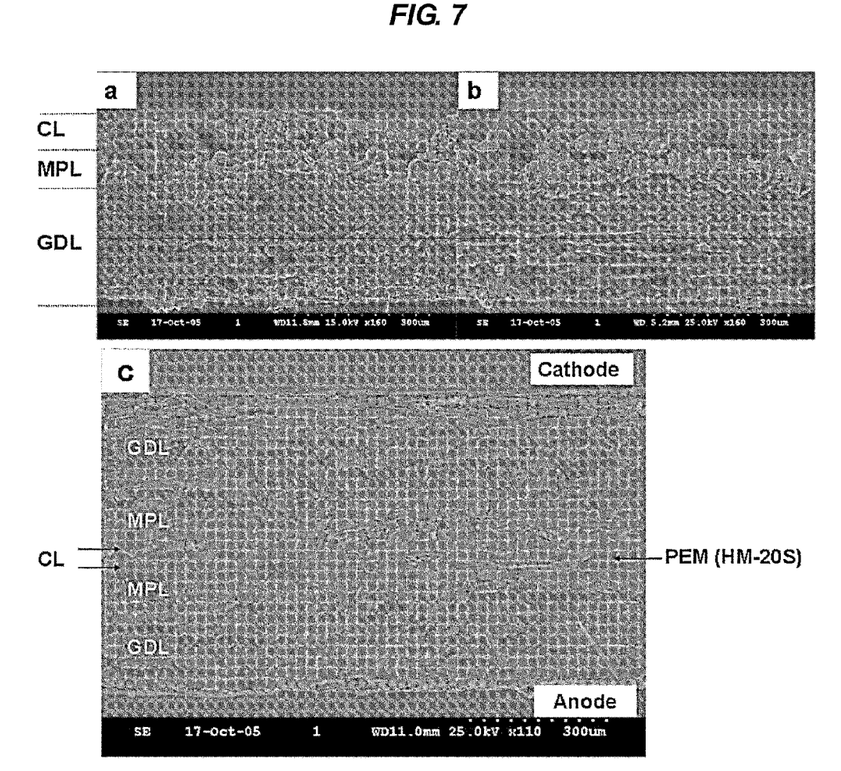
FIG. 7a shows an MEA including an anode of the reinforced composite membrane manufactured in accordance with the present invention.
FIG. 7b shows an MEA including a cathode of the reinforced composite membrane manufactured in accordance with the present invention.
FIG. 7c shows thicknesses of GDL, MPL and CL.
Figure 8:
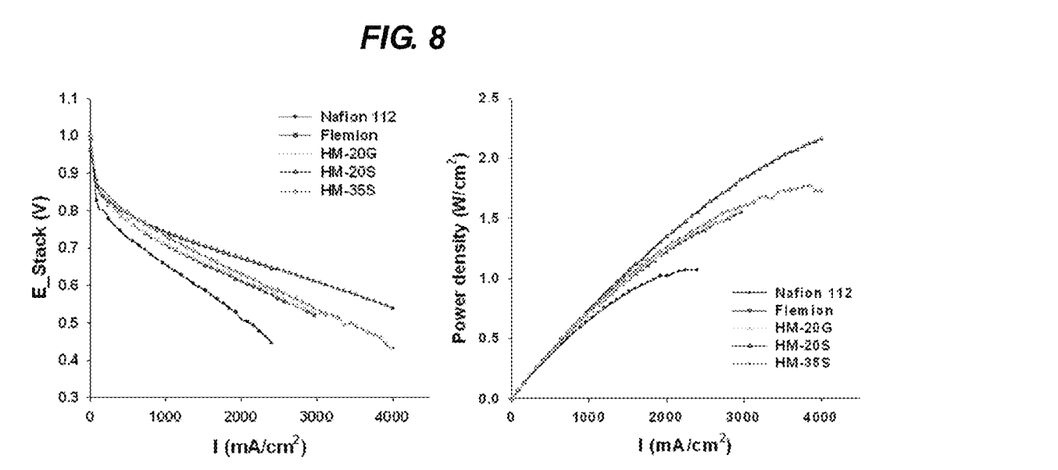
FIG. 8 are graphs showing the performance of fuel cells incorporating the electrolyte membranes of the present invention.

4. Performance assessment of fuel cells: After preparing a membrane electrolyte assembly (MEA), the assessment of fuel cells was made. First, the preparation of the anode and the cathode used in the MEA comprised: (1) coating carbon particles on porous carbon paper to form a microporous layer (MPL) and drying the microporous layer; (2) coating Pt/C catalyst layer (CL) thereon, in which the catalyst amount applied to the electrode surface was anode/cathode=0.2/0.4 mgPt/cm$^2$; and (3) inserting a membrane between the cathode and the anode formed like this and hot-pressed (150° C., 100 Kg/cm$^2$) to prepare an MEA. The anode, cathode and the lateral side SEM photograph of the MEA are depicted in FIGS. 7a, 7b, and 7c. As can be seen from FIGS. 7a, 7b, and 7c, the thicknesses of GDL, MPL and CL were identified as about 290, 80, 70 μm, respectively, and the catalyst layer of the cathode, to which the catalyst was applied much more than the anode, was denser. The membrane (HM-20S) well adhering closely to the CL surface was found as shown in the enlarged SEM photograph of the lateral side of the MEA (FIG. 5c) and, especially, it could be found that the bulky MPL and CL in FIGS. 5a and 5b were compressed to be dense through the hot-pressing process. After mounting the MEA prepared as described above in a unit cell (active area=5 cm$^2$), H$_2$ and O$_2$ were filled as fuels to assess the performances. Here, the assessment of the performances of the fuel cells used a 100 W MEDUSA fuel cell test station under the operation conditions of $T_A/T_{cell}/T_C$=95/80/90° C., H$_2$/O$_2$ flow=0.3 L/min., and back pressure=20 psi. The assessment results of I-V curve and power density are depicted in FIG. 8, in which the current density, the power density (at 0.6V, cell temperature=80° C. and RH=100%) and the maximum power density were calculated and depicted in Table 2. As can be seen from the results, the fuel cell performances varied remarkably depending on the kind of the membranes used and, in general, the high density reinforced composite membranes (HM series of the example) having a three-layer structure demonstrated higher performance than the commercial counterparts (Nafion 112 and Flemion SH). In detail, the power density of HM-20S at 0.6V was 2.4 times that of Nafion 112 and 1.5 times that of Flemion SH. Also, HM-35S showed a high power density of 1.44 times, even though the thickness of the membrane was two times larger than that of HM-20G, from which it could be understood that the membranes including HPW showed higher performances. It is expected that HM-20G formed in a thickness of 25 μm is more durable that the other membranes of lesser thickness.

In addition, the method of the present invention is effective in manufacturing membranes of diversified thickness since it allows for relative ease in controlling the thickness of the membrane.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention.

What is claimed is:
1. A method of manufacturing an electrolyte reinforced composite membrane with a multilayer comprising:
   stretching a porous film bidirectionally over the whole area;

coating and impregnating the stretched film with an electrolyte solution, drying the resulting film at about 80-130° C. and stretching the dried film wherein said coating and impregnating, drying and stretching are processed successively about two to ten times to form a matrix layer and said film is stretched uniformly and bidirectionally over the whole area while coating and impregnating and stretched while drying;

coating the upper and lower portions of the matrix layer with the electrolyte solution and drying the matrix layer at about 100-150° C. to form an electrolyte coated layer; and hot-pressing the electrolyte coated layer at about 120-150° C.

2. The method of claim 1, wherein the electrolyte is a perfluorinated ionomer or a mixture comprising a perfluorinated ionomer and a heteropoly acid.

3. The method of claim 1, wherein the film has a porosity of 80-90% and pores of 150-200 nm in diameter.

4. The method of claim 1, wherein the drying the resulting film temperature is at a temperature of about 120° C.

5. The method of claim 1, wherein the hot-pressing the electrolyte coated layer temperature is at a temperature of about 150° C.

6. The method of claim 1, wherein said matrix layer and said electrolyte coated layer have a 3 layer structure as (b) a mixture layer of a perfluorosulfonated ionomer and a heteropoly acid as the electrolyte coated layer/e-PTFE film impregnated with a mixture of a perfluorosulfonated ionomer and a heteropoly acid as the matrix layer/a mixture layer of a perfluorosulfonated ionomer and a heteropoly acid as the electrolyte coated layer.

7. The method of claim 1, wherein said matrix layer and said electrolyte coated layer have a 3 layer structure as (c) perfluorosulfonated ionomer layer as the electrolyte coated layer/e-PTFE film impregnated with a mixture of a perfluorosulfonated ionomer and a heteropoly acid as the matrix layer/perfluorosulfonated ionomer layer as the electrolyte coated layer.

8. The method of claim 1, wherein said matrix layer and said electrolyte coated layer have a 3 layer structure selected from:
(a) a perfluorosulfonated ionomer layer as the electrolyte coated layer/e-PTFE film impregnated with perfluorosulfonated ionomer as the matrix layer/perfluorosulfonated ionomer layer as the electrolyte coated layer,
(b) a mixture layer of a perfluorosulfonated ionomer and a heteropoly acid as the electrolyte coated layer/e-PTFE film impregnated with a mixture of a perfluorosulfonated ionomer and a heteropoly acid as the matrix layer/a mixture layer of a perfluorosulfonated ionomer and a heteropoly acid as the electrolyte coated layer, and
(c) a perfluorosulfonated ionomer layer as the electrolyte coated layer/e-PTFE film impregnated with a mixture of a perfluorosulfonated ionomer and a heteropoly acid as the matrix layer/perfluorosulfonated ionomer layer as the electrolyte coated layer.

9. A method of manufacturing an electrolyte reinforced composite membrane with a multilayer comprising:
coating and stretching a porous film bidirectionally over the whole area;
coating and impregnating the stretched film with an electrolyte solution, drying the resulting film at about 80-130° C. and stretching the dried film wherein said coating and impregnating, drying and stretching are processed successively about two to ten times to form a matrix layer and said film is stretched uniformly and bidirectionally over the whole area while coating and impregnating and stretched while drying;
coating the upper and lower portions of the matrix layer with the electrolyte solution and drying the matrix layer at about 100-150° C. to form an electrolyte coated layer; and
hot-pressing the electrolyte coated layer at about 120-150° C.,
wherein said porous film is expanded polytetrafluoroethylene (e-PTFE) film and said electrolyte is a perfluorosulfonated ionomer or a mixture comprising a perfluorosulfonated ionomer and a heteropoly acid, and
said matrix layer and said electrolyte coated layer have a 3 layer structure according to (a), (b) or (c);
(a) a perfluorosulfonated ionomer layer as the electrolyte coated layer/e-PTFE film impregnated with perfluorosulfonated ionomer as the matrix layer/perfluorosulfonated ionomer layer as the electrolyte coated layer,
(b) a mixture layer of a perfluorosulfonated ionomer and a heteropoly acid as the electrolyte coated layer/e-PTFE film impregnated with a mixture of a perfluorosulfonated ionomer and a heteropoly acid as the matrix layer/a mixture layer of a perfluorosulfonated ionomer and a heteropoly acid as the electrolyte coated layer, or
(c) a perfluorosulfonated ionomer layer as the electrolyte coated layer/e-PTFE film impregnated with a mixture of a perfluorosulfonated ionomer and a heteropoly acid as the matrix layer/perfluorosulfonated ionomer layer as the electrolyte coated layer.

10. A method of manufacturing an electrolyte reinforced composite membrane with a multilayer comprising:
stretching a porous film bidirectionally over the whole area;
coating and impregnating the stretched film with an electrolyte solution, drying the resulting film at about 80-130° C. and stretching the dried film wherein said coating and impregnating, drying and stretching are processed successively and said film is stretched uniformly and bidirectionally over the whole area while coating and impregnating and stretched while drying; and
coating the upper and lower portions of the matrix layer with the electrolyte solution and drying the matrix layer at about 100-150° C. to form an electrolyte coated layer.

11. An electrolyte reinforced composite membrane prepared by the method according to claim 1.

* * * * *